United States Patent
Kotaru et al.

(10) Patent No.: US 12,192,059 B1
(45) Date of Patent: Jan. 7, 2025

(54) VIRTUALIZED CELLS WITH MULTIPLE ANTENNAS IN A VIRTUAL RADIO ACCESS NETWORK

(71) Applicant: MICROSOFT TECHNOLOGY LICENSING, LLC, Redmond, WA (US)

(72) Inventors: Manikanta Kotaru, Kenmore, WA (US); Atul Bansal, Pittsburgh, PA (US); Xenofon Foukas, Cambridge (GB); Anuj Kalia, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/211,546

(22) Filed: Jun. 19, 2023

(51) Int. Cl.
*H04L 41/0895* (2022.01)
*H04L 41/0813* (2022.01)

(52) U.S. Cl.
CPC ...... *H04L 41/0895* (2022.05); *H04L 41/0813* (2013.01)

(58) Field of Classification Search
None
See application file for complete search history.

(56) References Cited

U.S. PATENT DOCUMENTS

| 10,425,823 | B2 * | 9/2019 | Yu | H04W 16/04 |
| 2014/0242999 | A1 * | 8/2014 | Goshen | H04L 43/0823 455/445 |
| 2022/0131664 | A1 * | 4/2022 | Nam | H04L 5/0032 |
| 2023/0014537 | A1 | 1/2023 | Berg | |
| 2023/0037701 | A1 * | 2/2023 | Pinheiro | H04W 88/085 |

FOREIGN PATENT DOCUMENTS

| JP | 2022165659 A | 11/2022 |
| WO | 2023091664 A1 | 5/2023 |

OTHER PUBLICATIONS

International Search Report and Written Opinion received for PCT Application No. PCT/US2024/034560, mailed on Oct. 15, 2024, 16 pages.

* cited by examiner

*Primary Examiner* — Kamal M Hossain
(74) *Attorney, Agent, or Firm* — Han Gim; Newport IP, LLC

(57) ABSTRACT

Techniques are disclosed for dynamically adjusting associations between radio units (RUs) and a virtualized radio access network (vRAN) by a virtual translational layer running in a controller of the vRAN. Each of the RUs have a number of antennas and are configured to service a cell of a cellular communications network. Based on performance metrics, the virtual translational layer maps the RUs to a virtualized cell of the cellular communications network, the virtualized cell including a mapped selection of the RUs.

17 Claims, 13 Drawing Sheets

VIRTUALIZED CELLS WITH MULTIPLE ANTENNAS IN A VIRTUAL RADIO ACCESS NETWORK

BACKGROUND

Next generation wireless networks have the promise to provide higher throughput, lower latency, and higher availability compared with previous global wireless standards. Fifth generation (5G) wireless networks utilize control and user plane separation (CUPS) and multi-access edge computing (MEC), which allows compute and storage resources to be moved from a centralized cloud location to the "edges" of a network and electrically closer to end user devices and equipment, to enable low-latency applications with millisecond response times. However, wireless spectrum for wireless networks is a limited resource, and yet higher throughput is a continuing demand. One method for meeting this demand is to increase the number of antennas at each base station. However, this approach is expensive and complex to deploy and manage. Furthermore, the throughput will saturate after a threshold number of antennas is reached. Another approach is to increase the density of cellular base stations. However, interference between cells operating in the same frequencies increases as the distance between base stations decreases.

SUMMARY

Systems and methods for improving the performance and efficiency of virtual Radio Access Networks (vRANs) are provided. Various embodiments include a virtual translational layer that is implemented between a vRAN and radio units (RUS). In one embodiment, the virtual translational layer is configured to emulate a single base station with a large antenna array to the VRAN. Similarly, for the base stations, the virtual translational layer is configured to emulate two or more different cells. The vRAN and RUs are agnostic as to whether they are connected to two different cells or whether they are connected to a single cell.

According to some embodiments, the technical benefits of the systems and methods disclosed herein include reduced power and energy consumption of the computing and data storage resources required for providing a telecommunications infrastructure. Other technical benefits including improved system performance and reduced cost to provide portions of a telecommunications infrastructure may also be realized through implementations of the disclosed technologies.

This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Techniques are described for implementing a coordinated multipoint (CoMP) approach in a telecommunications network, where multiple base stations with a number of antennas across multiple cells are emulated to appear as a single cell having a larger total number of antennas. In various embodiments, a virtual translational layer is implemented between a virtual Radio Access Network (vRAN) and one or more radio units (RUs). The virtual translational layer is configured to interoperate with various standards such as 3GPP protocols for 4G, 5G, Open RAN (O-RAN), and other standards.

In an embodiment, the virtual translational layer emulates a single base station with a large antenna array to the vRAN. The virtual translational layer operates so that the vRAN is agnostic as to whether it is connected to multiple RUs and the RUs are agnostic as to whether they are connected to multiple cells or connected to single cell. In some embodiments, uplink transmissions are used to determine clock offsets between different RUs which allows for correction of downlink packets. Since the underlying physical RUs are virtualized, this will allow for the potential frequency differences between the different RUs to be compensated for, which is important for maintaining accurate timing and synchronization between the RUs and user equipment.

Figure 1A:
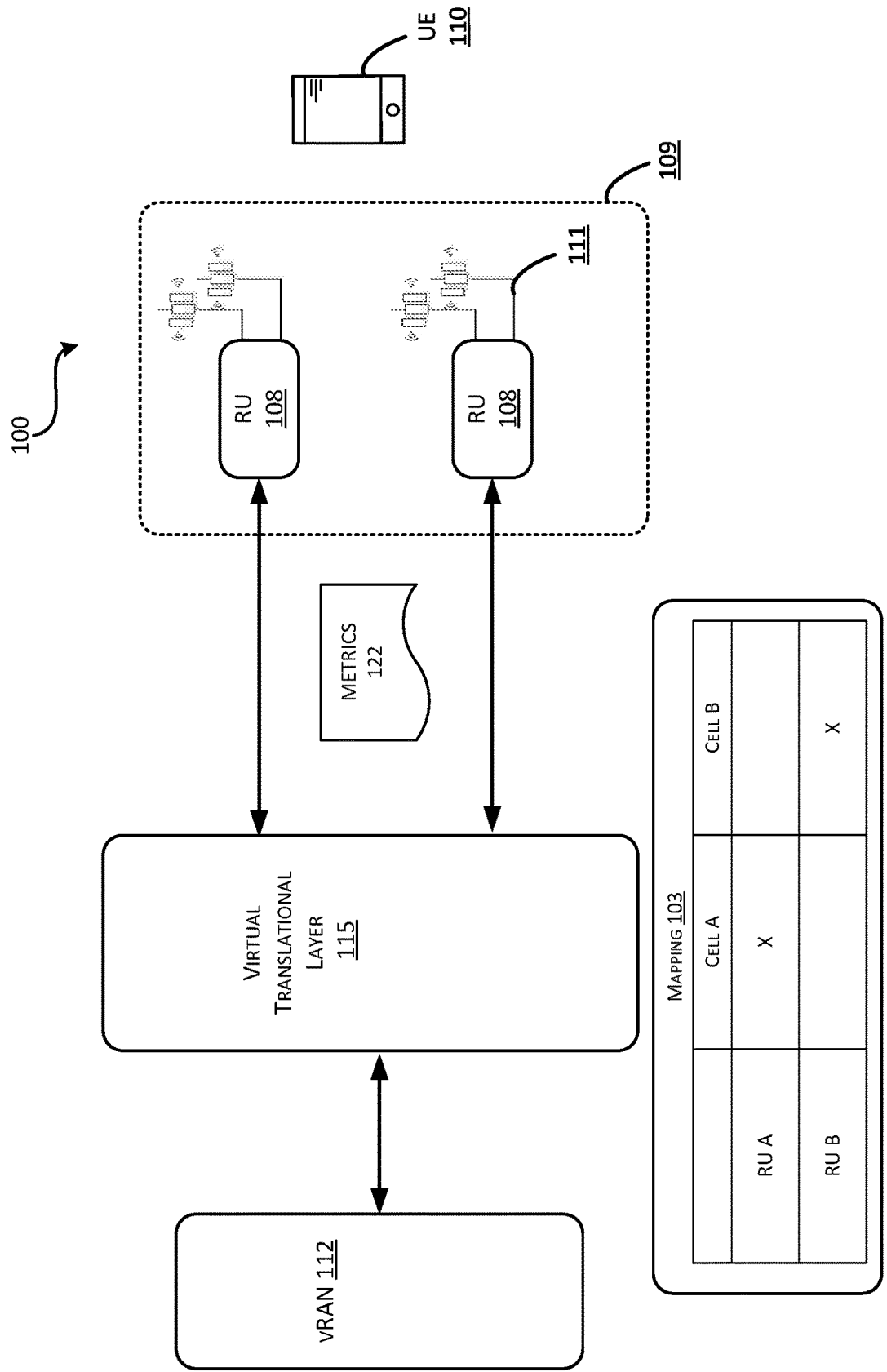
FIG. 1A illustrates an example implementation of a COMP system in accordance with the present disclosure.

Referring to FIG. 1A, a virtual translational layer 115 dynamically adjusts associations between radio units (RUs) 108 and a virtualized radio access network (vRAN) 112. The virtual translational layer 115 can run in a controller of the vRAN with reference to FIG. 2. Each of the RUs 108 have a number of antennas 111 and are configured to service a cell of a cellular communications network 100. The virtual translational layer 115 receives data indicative of performance metrics 122 associated with the cellular communications network 100. Based on the performance metrics 122, the virtual translational layer 115 maps the RUs 108 to a virtualized cell 109 of the cellular communications network 100. The virtualized cell 109 includes a mapped selection 103 of the RUs 108. The virtual translational layer 115 exposes the virtualized cell 109 as a single cell to the vRAN 112. The virtual translational layer exposes the virtualized cell 109 as a single cell to user equipment 110 that are accessing the cellular communications network 100. This enables the vRAN 112 and the user equipment 110 to interoperate with the virtualized cell 109 as a single cell.

Figure 2:
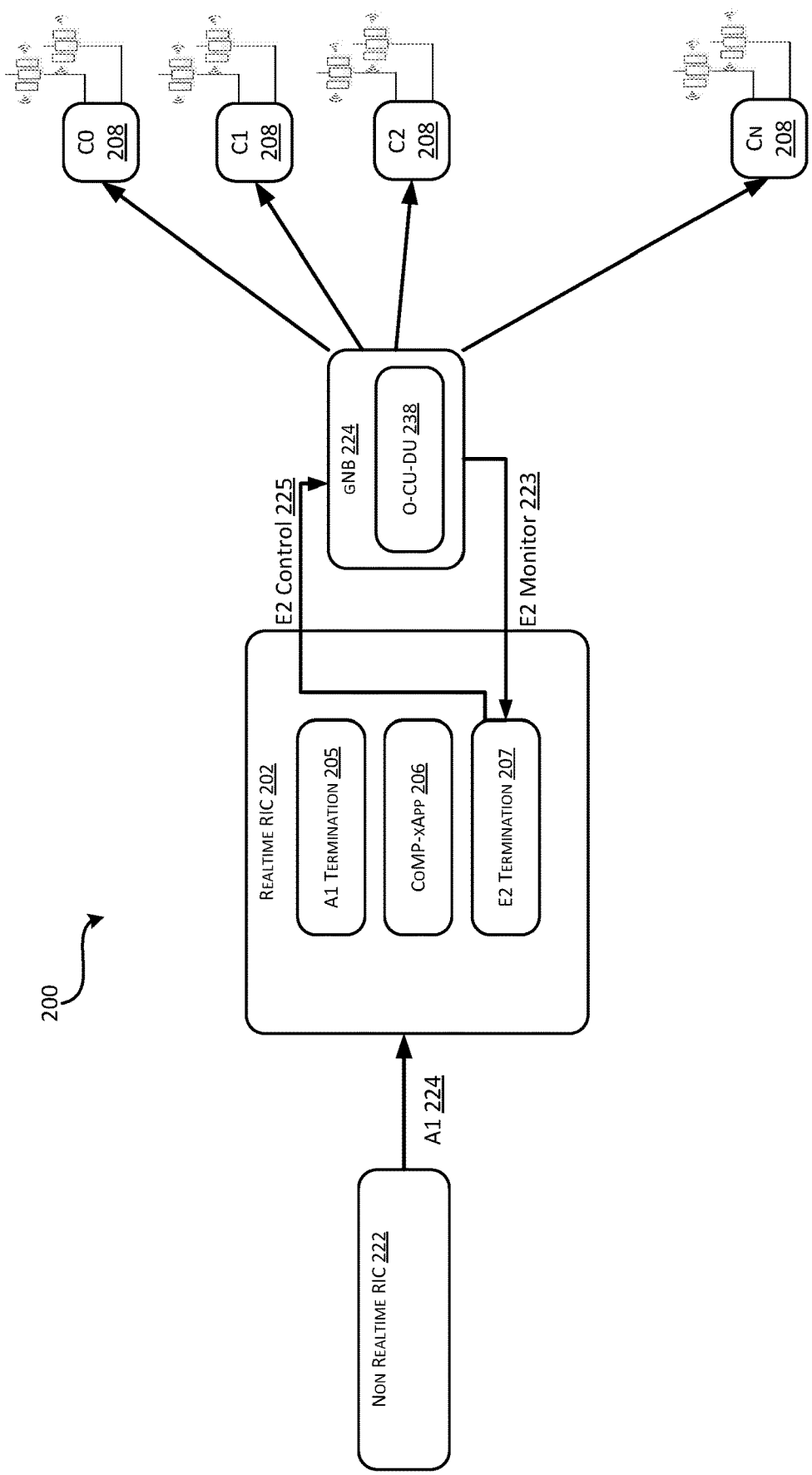
FIG. 2 illustrates an example implementation of a COMP system in accordance with the present disclosure.

In some embodiments, and with reference to FIG. 2, a virtual translational layer is implemented in non-real-time 222 and real-time 202 components of a RAN Intelligent Controller (RIC) 200 which can be a cloud native application configured to control and optimize communication functions on a RAN. In one embodiment, cell IDs are virtualized at the A1 interface 224 of the RIC 200, and dummy MACs are used for the fronthaul packets. At the E2 monitoring interface 223, frequency offsets between RUs are determined, EU and cell identities are monitored, and for each UE, downlink and uplink throughput, bit error rate (BER), and signal-to-noise ratio (SNR) are monitored. At the E2 Control (E2C) interface 225, frequency offset correction is applied, and fronthaul packet mapping is performed.

The disclosed embodiments enable higher throughput in dense user environments while avoiding issues with complexity and interference between cells. Dynamic configuration of parameters such as RU-to-virtual cell mapping further allows for the communications network to handle variations in SNR and respond to variations in network conditions such as port data rate and packet error rate. This allows a service provider to dynamically map the physical radios to virtual cells in response to variations in user density patterns and improve the coverage of a deployed network by using in-field SNR, error rate measurements, and other QoS metrics from UEs to configure COMP parameters.

The geographical area associated with a mobile communications network is typically divided into a number of cells. Each cell is associated with a base station which is operating on one or more frequencies. Cells that are operating on the same frequency are physically spaced apart from each other so that they do not interfere with one another. In order to increase the throughput in a given geographic area, the size of these cells can be decreased in order to increase cell density. By reducing the size of the cells, in effect more signal power is provided at the mobile phones. However, one problem with this approach is that as the size of the cells are reduced, the interference between cells operating on the same operating frequencies increases because the distance between base stations that are operating on the same frequency decreases.

Given a geographical cell structure with multiple base stations with each base station having a number of antennas, the disclosed COMP embodiments emulate a single cell having a large number of antennas. This approach allows for the described advantages to be realized without an increase in cost and complexity of the system while increasing the effective capacity of the system. At the same time, the capacity is increased without increasing interference between adjacent cells since a given area is effectively operating as a single cell. Additionally, greater spectral efficiency can be achieved by maximally utilizing a given frequency.

Figure 1B:
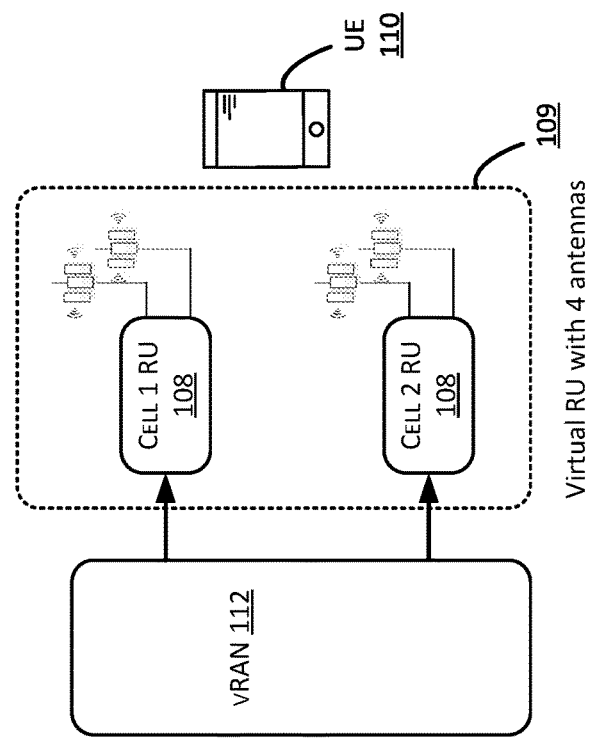
FIG. 1B illustrates an example implementation of a COMP system in accordance with the present disclosure.
Figure 1B:
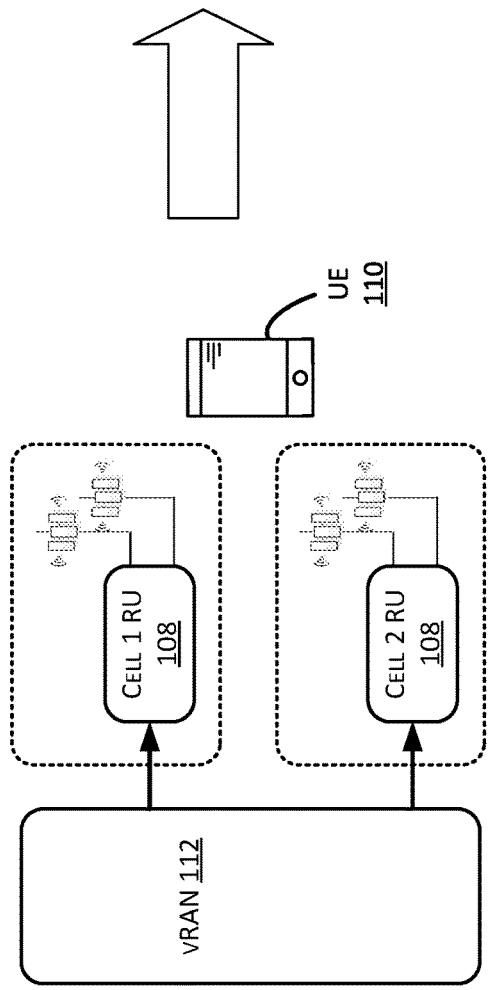

FIG. 1B illustrates an example Open Radio Access Network (ORAN)-based system that includes vRAN 112 that is connected to two different cells 108 serving UE 110, where a cell comprises a base station having a RU. The base stations in the cells 108 operate individually from each other and may operate on different frequencies. When COMP is implemented over such a network, COMP enables both cells to act as a single virtual cell 109 with the total number of antennas being the sum of the individual number of antennas.

COMP is primarily implemented on software, thus avoiding hardware modifications and allowing for scalable growth and efficient management of resources. Additionally, COMP can enable compatibility with open RU standards and thus avoid the need to design a custom base station. For example, COMP can be implemented in a manner that is consistent with 3G protocols for 4G, 5G, and ORAM.

Referring back to FIG. 1A, the virtual translational layer 115 is implemented between the vRAN 112 and the base stations. In one embodiment, the virtual translational layer 115 is configured to emulate a single base station with a large antenna array to the VRAN 112. Similarly, for the base stations, the virtual translational layer 115 is configured to emulate two or more different cells. The vRAN 112 and RUs 108 are agnostic as to whether they are connected to two different cells or that they are connected to a single cell.

Figure 1C:
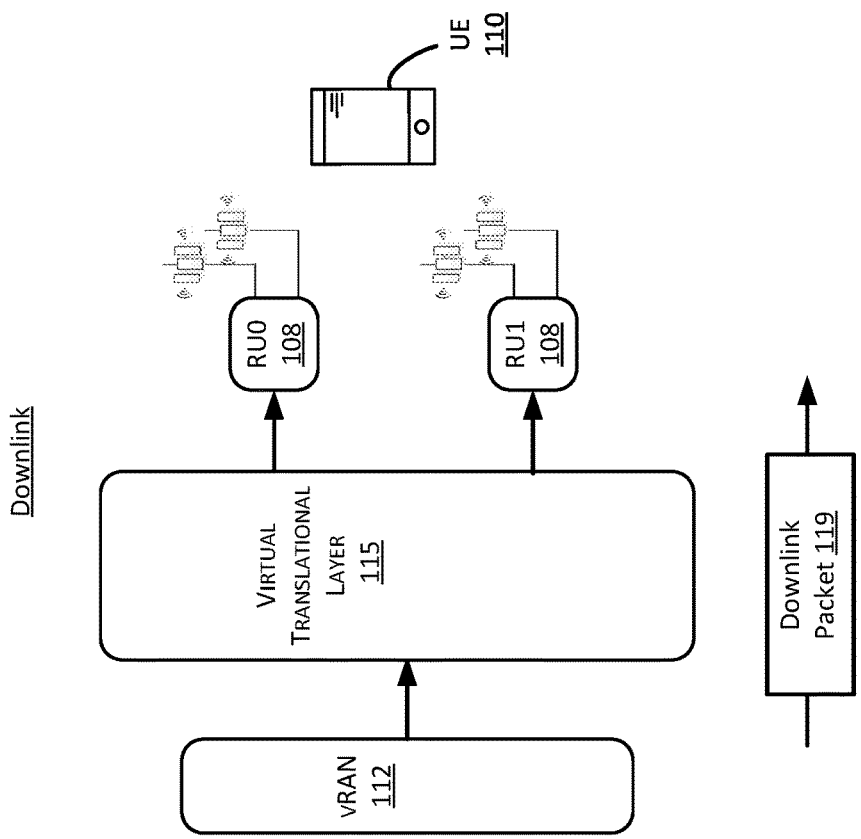
FIG. 1C illustrates an example implementation of a COMP system in accordance with the present disclosure.
Figure 1C:
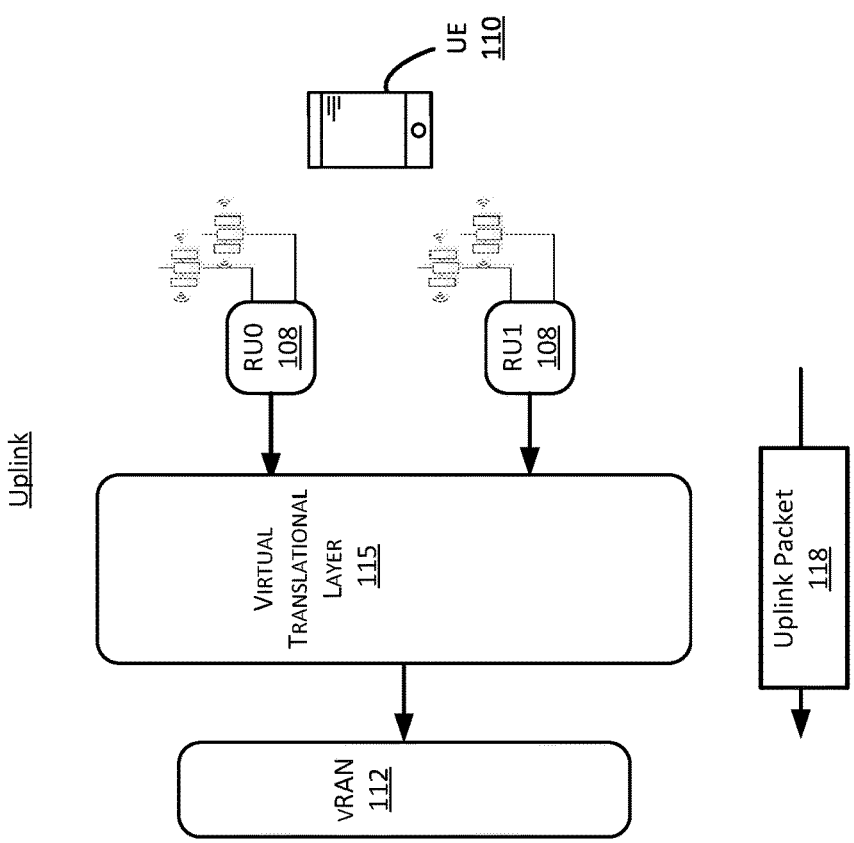

Referring to FIG. 1C, in one embodiment, the virtual translational layer 115 is configured to correct for residual frequency offsets between the clocks or oscillators of different RUs 108. In one embodiment, the frequency offsets are determined based on the uplink packets 118 that are received from the user devices or UE 110 and their associated uplink transmissions. The frequency offsets are used to correct the downlink packets 119 and enable greater throughput and data rates. Additionally, the virtual translational layer 115 is configured to enable dynamic configuration of COMP parameters such as analyzing feedback from the mobile devices such as the signal to noise ratio (SNR), port data rate, and packet error rate. Such parameters and statistics can be used to dynamically change the radio-to-virtual cell mapping, for example, whether a given RU should be included in the COMP scheme. One objective of the virtual translation layer 115 is to use the uplink packets 118 to correct packet mapping, estimate the frequency offset between RUs, and provide corrections. In an embodiment, the downlink packets 119 are corrected to nullify the effect of the estimated clock offsets.

With reference to FIG. 2, in an embodiment, the virtual translational layer 115 is implemented with a RAN intelligent controller (RIC) 200. The RAN intelligent controller 200 has different components which include real time components 202 or non real time components 222, including A1 termination 205, COMP xApp (eXtended application) 206, and E2 termination 207. gNB 224 including O-CU-DU 238 communicates with RUs 208 (illustrated as C0, C1, C2, . . . Nn). Real time components 202 can cause changes in the RAN in real time and the non real time components 222 can perform tasks that take more time to process and to change or update components.

In an embodiment, frequency offset correction is performed between RUs at the E2 monitoring function 223. Packet mapping is also performed in real time. The RAN intelligent controller 200 includes an E2 monitoring function 223 that provides real time updates that can include, for example, determining which cell IDs need to be virtualized or which IDs need to be combined to act as a single cell. The E2 monitoring function 223 obtains feedback from the network to determine parameters such as the estimated frequency offset. The E2 monitoring function 223 determines which RU that a RAN is connected to, what cells 208 the RAN is connected to, and associated feedback pertaining to downlink/uplink throughput, bit error rate, or SNR for each mobile device. The feedback is collected from the network and acted upon in real time.

The disclosed techniques allow for the emulation of one or more virtual cells that have a plurality of antennas, where front haul packets from multiple RUs are processed. The virtual translational layer dynamically maps the physical RUs to virtual cells in response to variations in user density pattern and other factors. The virtual translational layer improves the coverage of a deployed network by using infield SNR rate measurements and the other Qos metrics from mobile devices to dynamically configure COMP parameters.

The technologies described herein provide improvements in the use of resources for vRANs. The disclosed virtual translational layer dynamically adjusts mappings between RUs and cells based on fluctuations in network traffic, throughput, latency, and/or packet error rates with the goal of increasing resource efficiency while maintaining quality of service (Qos) metrics. The QoS metrics may include, for example, satisfying a threshold network throughput (e.g., a throughput of at least 10 Gbps) or a threshold network latency (e.g., a latency of less than 2 ms or a latency that does not exceed 2 ms).

A RAN comprises a portion of a wireless network infrastructure that converts wireless signals between user devices (or user equipment or UEs) and radio cell towers into data packets and vice versa. A virtualized RAN (vRAN) implements RAN functionality including baseband and wireless radio functions for the wireless network infrastructure as software, which can be executed using commercial-off-the-shelf (COTS) hardware.

The RAN intelligent controller for dynamically allocating mappings between RUs and cells is in communication with various RAN components including components associated with the physical layer (PHY), medium access control (MAC) layer, and radio link control (RLC) layer.

In some embodiments, the virtual translational layer determines and adjusts the mappings between RUs and cells in real-time. The virtual translational layer periodically acquires real-time telemetry data and real-time wireless network performance information and then adjusts the mappings between RUs and cells based on the telemetry data and wireless network performance information. The wireless network performance information can include data transmission times, throughput data rates, data error rates, uplink queue lengths, downlink queue lengths, and average queuing delays.

The virtual translational layer can detect that the mapping between RUs and cells should be adjusted in response to detection that a deviation in network traffic, an average queueing delay, a total queue size, or other parameter has occurred. In one example, if an average queuing delay has exceeded a target queuing delay (e.g., has exceeded 1 ms), then the number of RUs allocated to a cell may be increased. The number of RUs may be increased additively or multiplicatively in proportion to the difference between the detected value of the parameter and the target value of the parameter. The virtual translational layer may also periodically update mapping between RUs and cells by observing historical values for parameters during past time intervals and then adjusting the mapping to reduce power consumption while satisfying a QoS metric such as maintaining an average network latency or a queuing delay of buffered data.

In some embodiments, a reinforcement learning approach may be utilized to predict an optimum mapping between RUs and cells based on historical data. The state (or input to a reinforcement learning algorithm) may comprise the historical time series for various parameters. The action (or output of the reinforcement learning algorithm) may comprise specific mappings between particular RUs and particular cells. The reward function (or feedback received by the reinforcement learning algorithm) may comprise feedback from the RAN system that indicates a mapping's quality. The reward function may comprise a function that penalizes, for example, higher RU density and reduced spectrum usage. The reinforcement learning algorithm may be encoded into a neural network that is trained to learn the mapping of states to actions so as to maximize the reward function.

Figure 3A:
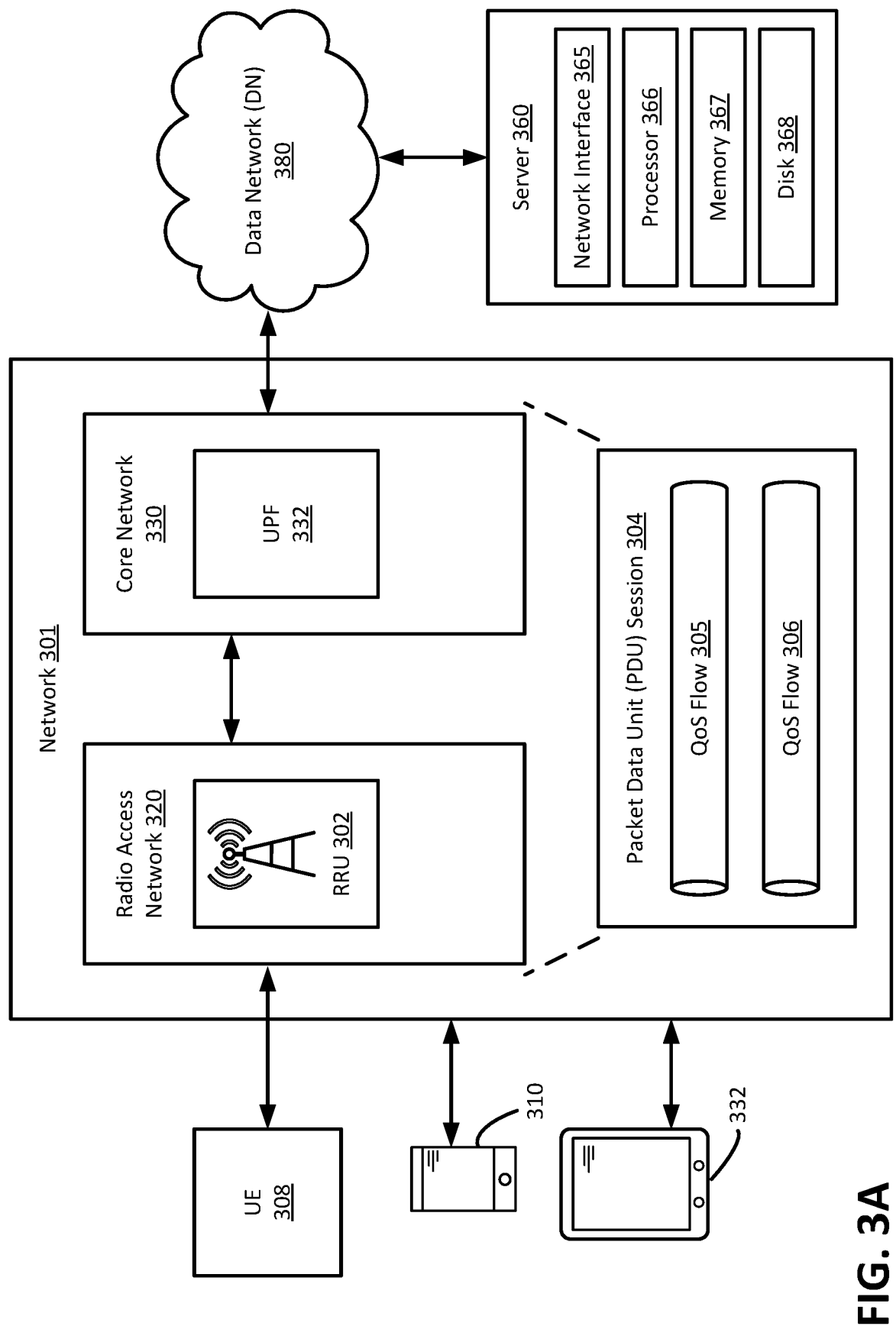
FIG. 3A illustrates an example system in accordance with the present disclosure.

FIG. 3A depicts an embodiment of a network 301 (e.g., a 5G network) including a radio access network (RAN) 320 and a core network 330. The radio access network 320 may comprise a new-generation radio access network (NG-RAN) that uses the 5G new radio interface (NR). The network 301 electrically connects user equipment (UE) to the data network (DN) 380 using the radio access network 320 and the core network 330. The user equipment in communication with the radio access network 320 includes UE 308, mobile phone 310, and mobile computing device 312. The data network 380 may comprise the Internet, a local area network (LAN), a wide area network (WAN), a private data network, a wireless network, a wired network, or a combination of networks. The data network 380 may connect to or be in communication with server 360.

A server, such as server 360, may allow a client device, such as the mobile computing device 312, to download information or files (e.g., executable, text, application, audio, image, or video files) from the server. The server 360 may comprise a hardware server or a virtual server. In some cases, the server 360 may act as an application server or a file server. In general, a server may refer to a hardware device that acts as the host in a client-server relationship or to a software process that shares a resource with or performs work for one or more clients. The server 360 includes a network interface 365, processor 366, memory 367, and disk 368 all in communication with each other. Network interface 365 allows server 360 to connect to data network 380. Network interface 365 may include a wireless network interface and/or a wired network interface. Processor 366 allows server 360 to execute computer readable instructions stored in memory 367 in order to perform processes described herein. Processor 366 may include one or more processing units, such as one or more CPUs, one or more GPUs, and/or one or more NPUs. Memory 367 may comprise one or more types of memory (e.g., RAM, SRAM, DRAM, EEPROM, Flash, etc.). Disk 368 may include a hard disk drive and/or a solid-state drive. Memory 367 and disk 368 may comprise hardware storage devices.

The UE 308 may comprise an electronic device with wireless connectivity or cellular communication capability, such as a mobile phone or handheld computing device. In one example, the UE 308 may comprise a smartphone or a cellular device that connects to the radio access network 320 via a wireless connection. The UE 308 may comprise one of a plurality of UEs not depicted that are in communication with the radio access network 320. The UEs may include mobile and non-mobile computing devices. The UEs may include laptop computers, desktop computers, Internet-of-Things (IOT) devices, and/or any other electronic computing device that includes a wireless communications interface to access the radio access network 320.

The radio access network 320 includes a remote radio unit (RRU) 302 for wirelessly communicating with UE 308. The RRU 302 may comprise a radio unit (RU) and may include one or more radio transceivers for wirelessly communicating with UE 308. The RRU 302 may include circuitry for converting signals sent to and from an antenna of a base station into digital signals for transmission over packet networks. The radio access network 320 may correspond with a 5G radio base station that connects user equipment to the core network 330. The 5G radio base station may be referred to as a generation Node B, a "gNodeB," or a "gNB." A base station may refer to a network element that is responsible for the transmission and reception of radio signals in one or more cells to or from user equipment, such as UE 308.

A control plane (CP) may comprise a part of a network that controls how data packets are forwarded or routed. The control plane may be responsible for populating routing tables or forwarding tables to enable data plane functions. A data plane (or forwarding plane) may comprise a part of a network that forwards and routes data packets based on control plane logic. Control plane logic may identify packets to be discarded and packets to which a high quality of service should apply.

The core network 330 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane functions may interact with each other using the service-based architecture. In some cases, a microservices-based architecture in which software is composed of small independent services that communicate over well-defined APIs may be used for implementing some of the core network functions. For example, control plane network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

In some cases, the primary core network functions may comprise the access and mobility management function (AMF), the session management function (SMF), and the user plane function (UPF). A UPF (e.g., UPF 332) may perform packet processing including routing and forwarding, quality of service (QOS) handling, and packet data unit (PDU) session management. The UPF may serve as an ingress and egress point for user plane traffic and provide anchored mobility support for user equipment. For example, the UPF 332 may provide an anchor point between the UE 308 and the data network 380 as the UE 308 moves between coverage areas. An AMF may act as a single-entry point for a UE connection and perform mobility management, registration management, and connection management between a data network and UE. An SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice may comprise an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements.

The network 301 may provide one or more network slices, wherein each network slice may include a set of network functions that are selected to provide specific telecommunications services. For example, each network slice may comprise a configuration of network functions, network applications, and underlying cloud-based compute and storage infrastructure. In some cases, a network slice may correspond with a logical instantiation of a wireless network, such as an instantiation of the network 301. User equipment, such as UE 308, may connect to one or more network slices at the same time. In one embodiment, a PDU session, such as PDU session 304, may belong to only one network slice instance. In some cases, the network 301 may dynamically generate network slices to provide telecommunications services for various use cases, such the enhanced Mobile Broadband (eMBB), Ultra-Reliable and Low-Latency Communication (URLCC), and massive Machine Type Communication (mMTC) use cases.

The core network 330 may include a plurality of network elements that are configured to offer various data and telecommunications services to subscribers or end users of user equipment, such as UE 308. Examples of network elements include network computers, network processors, networking hardware, networking equipment, routers, switches, hubs, bridges, radio network controllers, gateways, servers, virtualized network functions, and network functions virtualization infrastructure. A network element may comprise a real or virtualized component that provides wired or wireless communication network services.

Virtualization allows virtual hardware to be created and decoupled from the underlying physical hardware. One example of a virtualized component is a virtual router. Another example of a virtualized component is a virtual machine. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors, the size of a virtual memory, and the size of a virtual disk for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The network 301 may implement various network functions, such as the core network functions and radio access network functions, using a cloud-based compute and storage infrastructure. A network function may be implemented as a software instance running on hardware or as a virtualized network function. Virtual network functions (VNFs) may comprise implementations of network functions as software processes or applications. In one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 3A, the core network 330 includes a user plane function (UPF) 332 for transporting IP data traffic (e.g., user plane traffic) between the UE 308 and the data network 380 and for handling packet data unit (PDU) sessions with the data network 380. The UPF 332 may comprise an anchor point between the UE 308 and the data network 380. The UPF 332 may be implemented as a software process or application running within a virtualized infrastructure or a cloud-based compute and storage infrastructure. The network 301 may connect the UE 308 to the data network 380 using a packet data unit (PDU) session 304.

The PDU session 304 may utilize one or more quality of service (QOS) flows, such as QoS flows 305 and 306, to exchange traffic (e.g., data and voice traffic) between the UE 308 and the data network 380. The one or more QoS flows may comprise the finest granularity of QOS differentiation within the PDU session 304. The PDU session 304 may belong to a network slice instance through the network 301. To establish user plane connectivity from the UE 308 to the data network 380, an AMF that supports the network slice instance may be selected and a PDU session via the network slice instance may be established. In some cases, the PDU session 304 may be of type IPv4 or IPv6 for transporting IP packets.

The radio access network 320 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 308, over a geographic area.

Figure 3B:
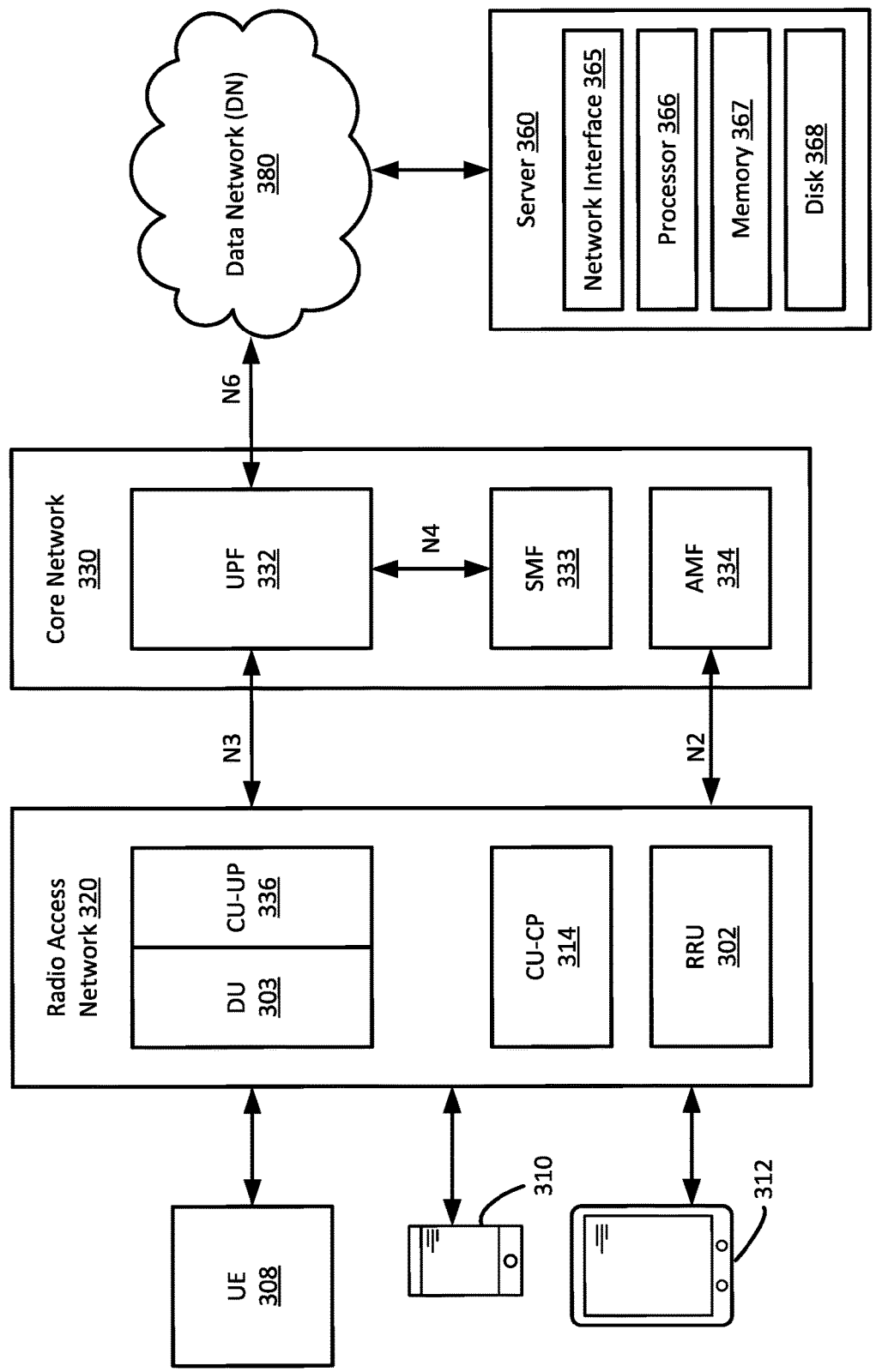
FIG. 3B illustrates an example system in accordance with the present disclosure.

FIG. 3B depicts an embodiment of a radio access network 320 and a core network 330 for providing a communications channel (or channel) between user equipment and data network 380. The communications channel may comprise a pathway through which data is communicated between the UE 308 and the data network 380. The user equipment in communication with the radio access network 320 includes UE 308, mobile phone 310, and mobile computing device 312.

A telecommunications link (or link) may refer to a communications channel that electrically connects two or more electronic devices. A communications channel may refer to a wireless communications channel, to a physical transmission medium (e.g., a wire or cable), or to a logical connection over a multiplexed medium (e.g., a radio channel). The two or more electronic devices may include, for example, routers, servers, and computing devices. The communications channel may allow data transmissions (e.g., data packets) to be exchanged between the two or more electronic devices. In some cases, a link may comprise a physical link or a virtual circuit that uses one or more physical links.

The core network 330 includes network functions such as an access and mobility management function (AMF) 334, a session management function (SMF) 333, and a user plane function (UPF) 332. The AMF may interface with user equipment and act as a single-entry point for a UE connection. The AMF may interface with the SMF to track user sessions. The AMF may interface with a network slice selection function (NSSF) not depicted to select network slice instances for user equipment, such as UE 308. When user equipment is leaving a first coverage area and entering a second coverage area, the AMF may be responsible for coordinating the handoff between the coverage areas whether the coverage areas are associated with the same radio access network or different radio access networks.

The UPF 332 may transfer downlink data received from the data network 380 to user equipment, such as UE 308, via the radio access network 320 and/or transfer uplink data received from user equipment to the data network 380 via the radio access network 380. An uplink may comprise a radio link though which user equipment transmits data and/or control signals to the radio access network 320. A downlink may comprise a radio link through which the radio access network 320 transmits data and/or control signals to the user equipment.

The radio access network 320 may be logically divided into an RRU 302, a distributed unit (DU) 303, and a centralized unit (CU) that is partitioned into a CU user plane portion CU-UP 336 and a CU control plane portion CU-CP 314. The CU-UP 336 may correspond with the centralized unit for the user plane and the CU-CP 314 may correspond with the centralized unit for the control plane. The CU-CP 314 may perform functions related to a control plane, such as connection setup, mobility, and security. The CU-UP 334 may perform functions related to a user plane, such as user data transmission and reception functions.

The RRU 302 may perform physical layer functions, such as employing orthogonal frequency-division multiplexing (OFDM) for downlink data transmission. In some cases, the DU 303 may be located at a cell site (or a cellular base station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer may comprise the highest L2 sublayer in the 5G NR protocol stack. In some embodiments, a radio access network may correspond with a single CU that connects to multiple DUs (e.g., connecting to ten DUs), and each DU may connect to multiple RRUs (e.g., connecting to 36 RRUs). In this case, a single CU may manage ten different cell sites (or cellular base stations) and 160 different RRUs.

Figure 3C:
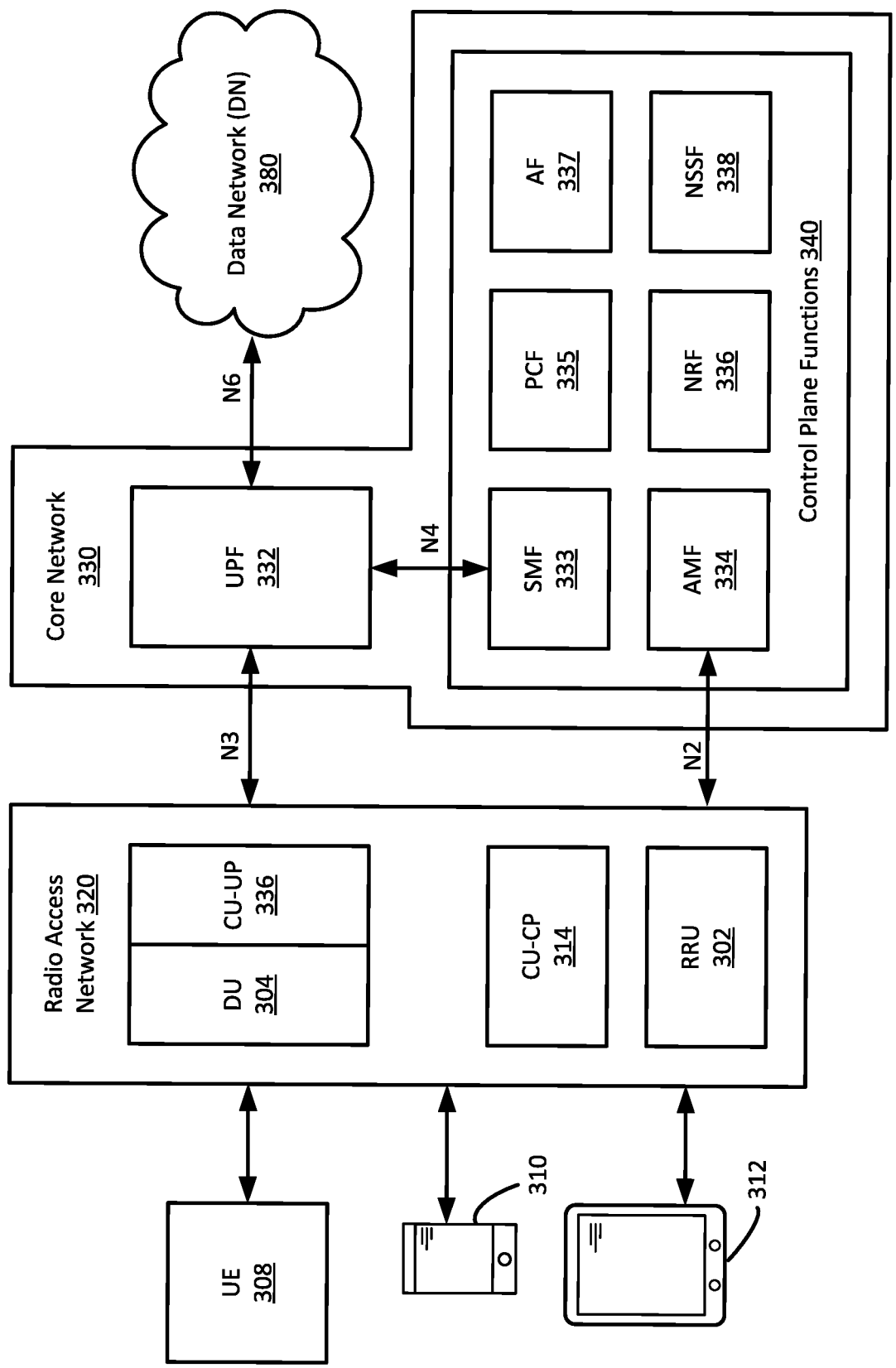
FIG. 3C illustrates an example system in accordance with the present disclosure.

FIG. 3C depicts an embodiment of a radio access network 320 and a core network 330 for providing a communications channel (or channel) between user equipment and data network 380. The core network 330 includes UPF 332 for handling user data in the core network 330. The N2 interface may be used for transferring control plane signaling between the radio access network 320 and the AMF 334. Data is transported between the radio access network 320 and the core network 330 via the N3 interface. The data may be tunneled across the N3 interface (e.g., IP routing may be done on the tunnel header IP address instead of using end user IP addresses). This may allow for maintaining a stable IP anchor point even though UE 308 may be moving around a network of cells or moving from one coverage area into another coverage area. The UPF 332 may connect to external data networks, such as the data network 380 via the N6 interface. The data may not be tunneled across the N6 interface as IP packets may be routed based on end user IP addresses. The UPF 332 may connect to the SMF 333 via the N4 interface.

As depicted, the core network 330 includes a group of control plane functions 340 comprising SMF 333, AMF 334, PCF 335, NRF 336, AF 337, and NSSF 338. The SMF 333 may configure or control the UPF 332 via the N4 interface. For example, the SMF 333 may control packet forwarding rules used by the UPF 332 and adjust QoS parameters for QoS enforcement of data flows (e.g., limiting available data rates).

Figure 4:
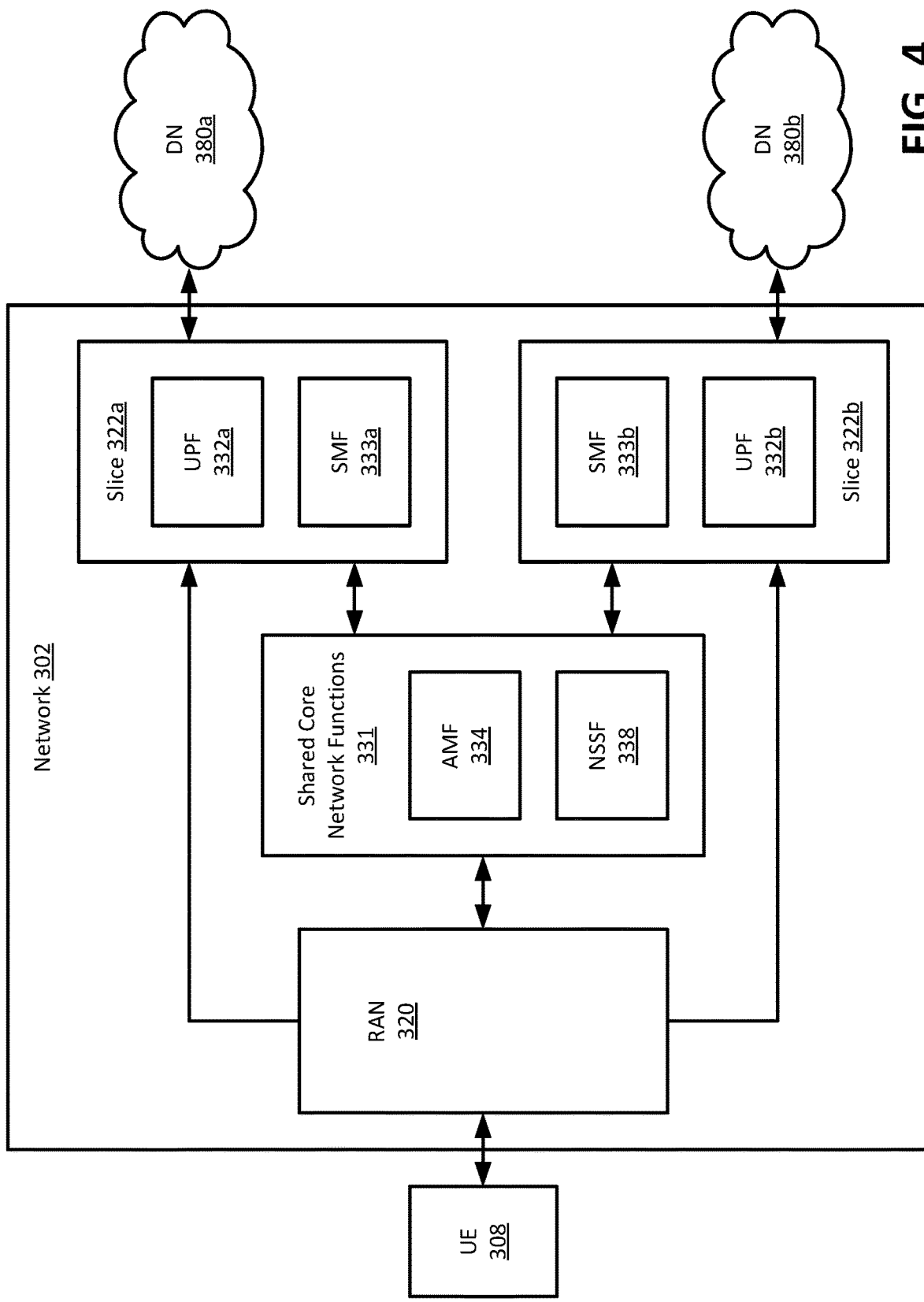
FIG. 4 illustrates an example system in accordance with the present disclosure.

FIG. 4 depicts an embodiment of a network 301 that includes network slices 322a and 322b (also referred to as network slices 322) sharing a set of shared core network functions 331. The set of shared core network functions 331 includes AMF 334 and NSSF 338. The radio access network (RAN) 320 may support differentiated handling of traffic between isolated network slices 322a and 322b for the UE 308. The network slice selection function (NSSF) 338 within the shared core network functions 331 may support the selection of network slice instances to serve the UE 308. In some cases, network slice selection may be determined by the network (e.g., using either NSSF 338 or AMF 334) based on network slice policy. The UE 308 may simultaneously connect to data networks 380a and 380b via the network slices 322a and 322b to support different quality of service (QOS) requirements.

Figure 5:
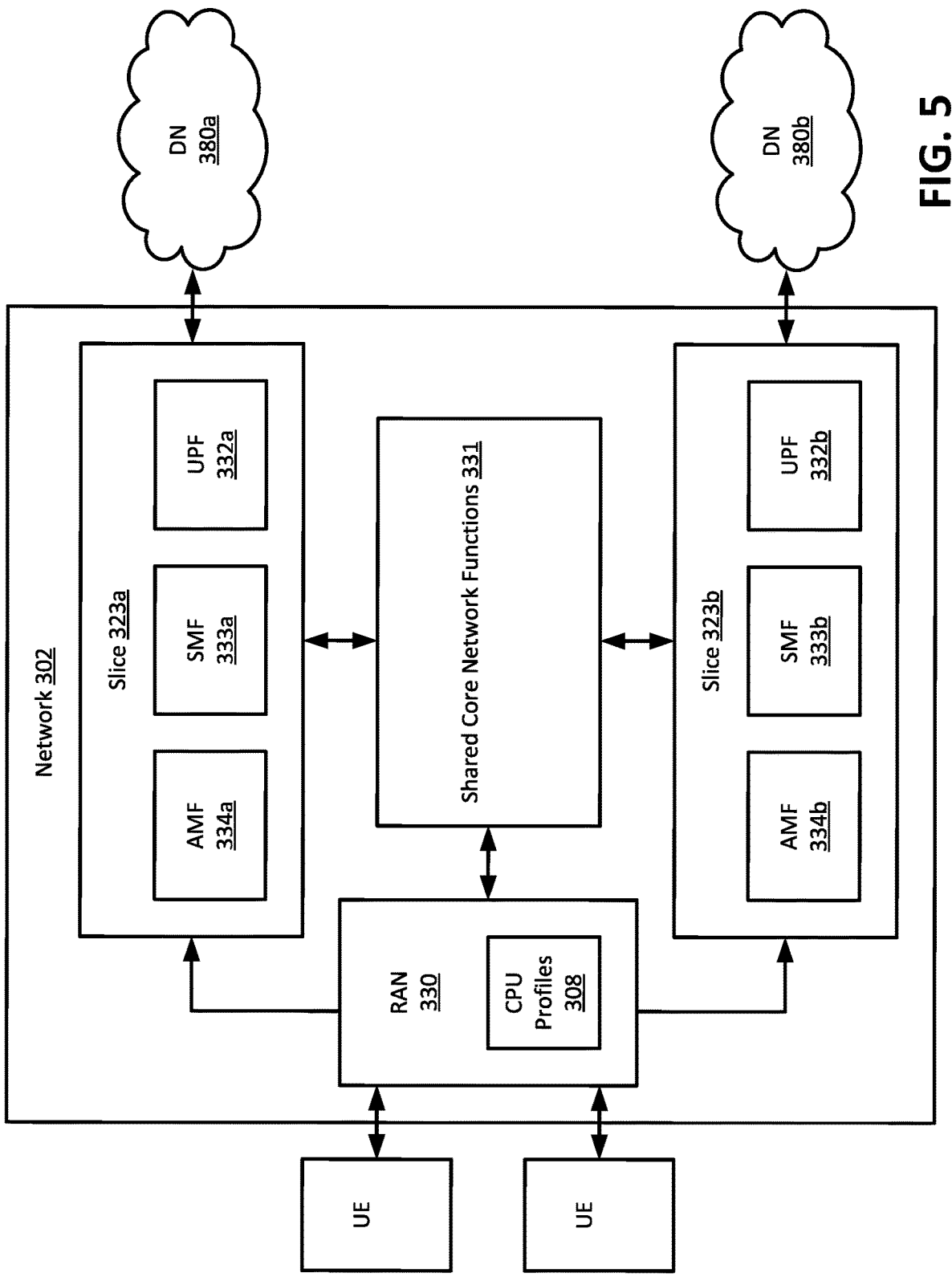
FIG. 5 illustrates an example system in accordance with the present disclosure.

FIG. 5 depicts an embodiment of a network 301 that includes network slices 323a and 323b (also referred to as network slices 323) sharing a set of shared core network functions 331. The network slices 323 may comprise network slices that were reconfigured from the network slices 322 depicted in FIG. 4. Network slices may be reconfigured over time due to changes in network slice policy or QoS requirements for each network slice. As depicted, the network slices 323a and 323b share a set of shared core network functions 331. Network slice 323a includes an AMF 334a, an SMF 333a, and a UPF 332a. Network slice 323b includes an AMF 334b, an SMF 333b, and a UPF 332b.

Figure 6:
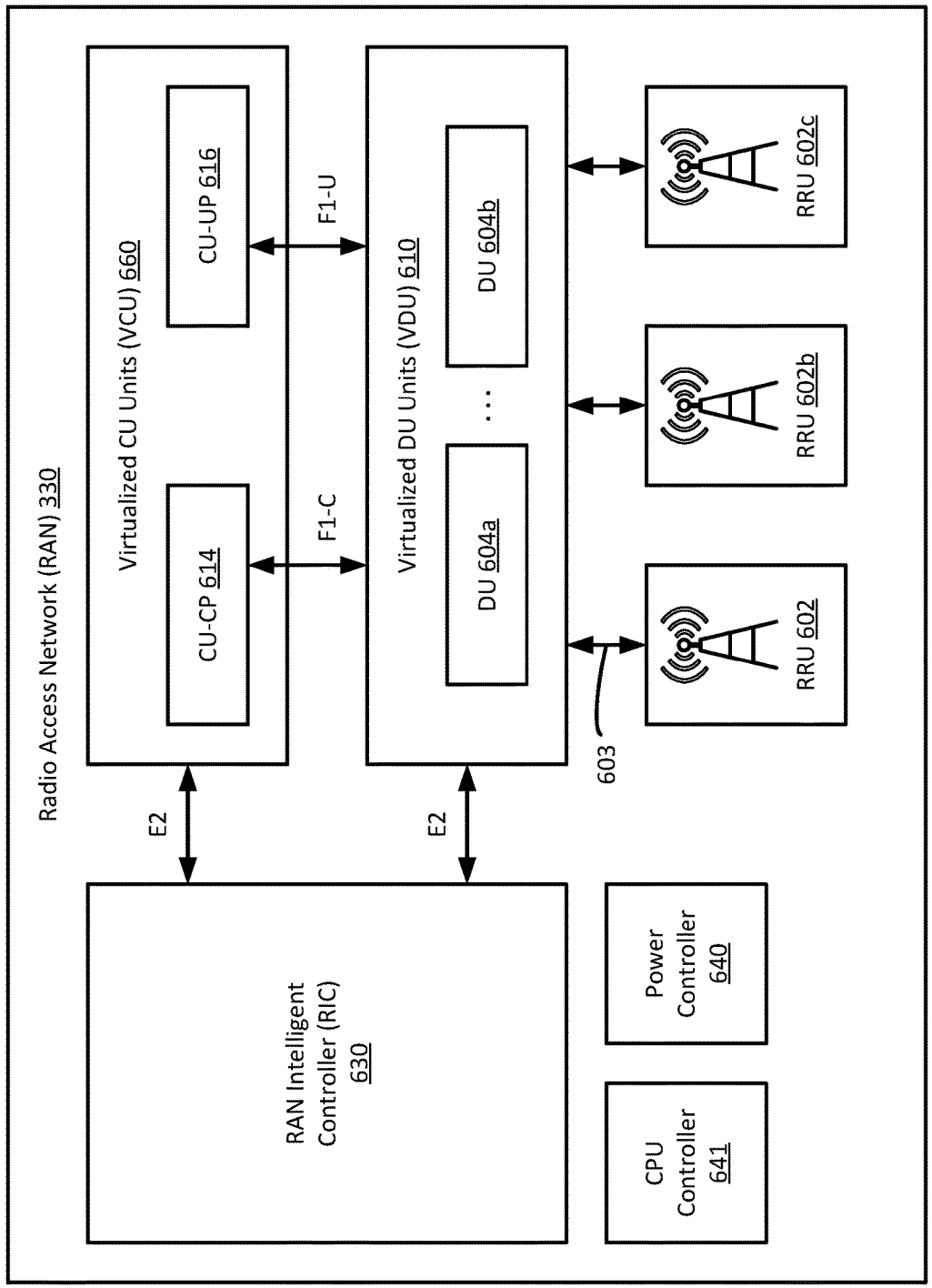
FIG. 6 illustrates an example system in accordance with the present disclosure.

FIG. 6 depicts an embodiment of a radio access network (RAN) 330. The radio access network 330 includes virtualized CU units 660, virtualized DU units 610, remote radio units (RRUs) 606-602c, a RAN intelligent controller (RIC) 630, and a power controller 640. The virtualized DU units 610 may comprise virtualized versions of distributed units (DUs), such as DU 604a-604b. Each distributed unit (DU) 604 may comprise a logical node configured to provide functions for the radio link control (RLC) layer, the medium access control (MAC) layer, and the physical layer (PHY) layers. The PHY layer may be responsible for signal processing operations and the MAC layer may be responsible for the real-time scheduling of radio resources among user devices. The RLC layer may perform error detection and correction tasks to provide a reliable wireless communications link between the RAN 320 and one or more user devices (or UEs).

The virtualized CU units 660 may comprise virtualized versions of centralized units (CUs) comprising a centralized unit for the user plane CU-CP 616 and a centralized unit for the control plane CU-CP 614. In one example, the centralized units (CUs) may comprise a logical node configured to provide functions for the radio resource control (RRC) layer, the packet data convergence control (PDCP) layer, and the service data adaptation protocol (SDAP) layer. The centralized unit for the control plane CU-CP 614 may comprise a logical node configured to provide functions of the control plane part of the RRC and PDCP. The centralized unit for the user plane CU-CP 616 may comprise a logical node configured to provide functions of the user plane part of the SDAP and PDCP. Virtualizing the control plane and user plane functions allows the centralized units (CUs) to be consolidated in one or more data centers on RAN-based open interfaces.

The remote radio units (RRUs) 606-602c may correspond with different cell sites. A single DU may connect to multiple RRUs via a fronthaul interface 603. The fronthaul interface 603 may provide connectivity between DUs and RRUs. For example, DU 604a may connect to 16 RRUs via the fronthaul interface 603. Centralized units (CUs) may control the operation of multiple DUs via a midhaul F1 interface that comprises the F1-C and F1-U interfaces. The F1 interface may support control plane and user plane separation, and separate the Radio Network Layer and the Transport Network Layer. In one example, the centralized unit for the control plane CU-CP 614 may connect to ten different DUs within the virtualized DU units 610. In this case, the centralized unit for the control plane CU-CP 614 may control ten DUs and 160 RRUs.

The RAN intelligent controller (RIC) 630 may control the underlying RAN elements via the E2 interface. The E2 interface connects the RAN intelligent controller (RIC) 630 to the distributed units (DUs) 604a-604b and the centralized units CU-CP 614 and CU-UP 616. The RAN intelligent controller (RIC) 630 may comprise a near-real time RIC. A non-real-time RIC (NRT-RIC) not depicted may comprise a logical node allowing non-real time control rather than near-real-time control and the near-real-time RIC 630 may comprise a logical node allowing near-real-time control and optimization of RAN elements and resources on the bases of information collected from the distributed units (DUs) 604a-604b and the centralized units CU-CP 614 and CU-UP 616 via the E2 interface.

The power controller 640 may be configured to dynamically adjust RAN power consumption based on fluctuations in network traffic, throughput, latency, and/or packet error rates in order to increase energy efficiency while maintaining quality of service (QOS) metrics, such as satisfying a threshold network throughput and a threshold network latency for a user device connection or a network slice. The power controller 640 may be configured to dynamically allocate physical resource blocks (PRBs) for the RAN 320.

Figure 7:
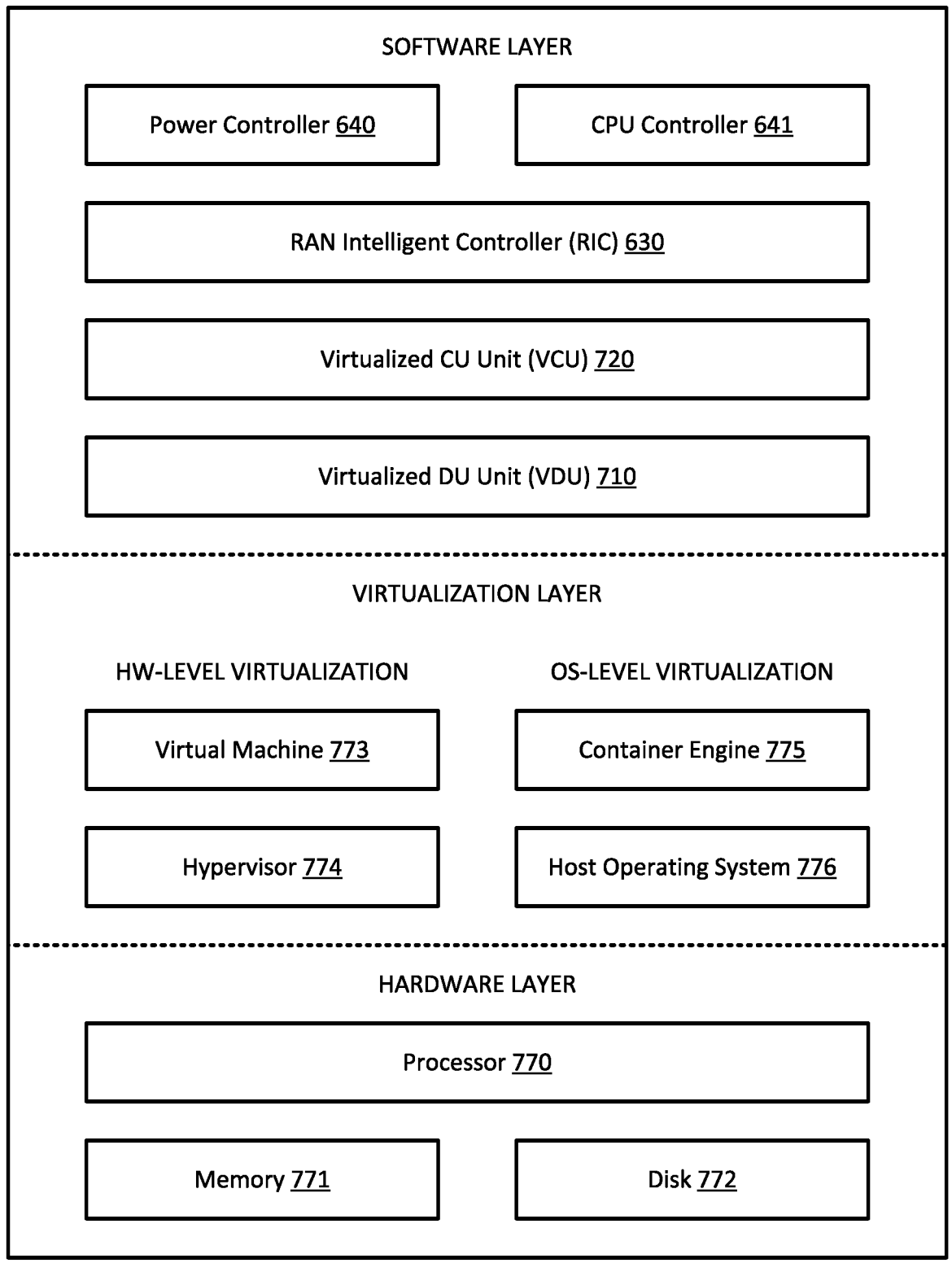
FIG. 7 illustrates an example system in accordance with the present disclosure.

FIG. 7 depicts another embodiment of a radio access network 320. As depicted, the radio access network 320 includes hardware-level components and software-level components. The hardware-level components include one or more processors 770, one or more memory 771, and one or more disks 772. The software-level components include software applications, such as the power controller 640, CPU controller 641, RAN intelligent controller (RIC) 630, virtualized CU unit (VCU) 720, and virtualized DU unit (VDU) 710. The software-level components may be run using the hardware-level components or executed using processor and storage components of the hardware-level components. In one example, one or more of the power controller 640, RIC 630, VCU 720, and VDU 710 may be run using the processor 770, memory 771, and disk 772. In another example, one or more of the power controller 640, RIC 630, VCU 720, and VDU 710 may be run using a virtual processor and a virtual memory that are themselves executed or generated using the processor 770, memory 771, and disk 772.

The software-level components also include virtualization layer processes, such as virtual machine 773, hypervisor 774, container engine 775, and host operating system 776. The hypervisor 774 may comprise a native hypervisor (or bare-metal hypervisor) or a hosted hypervisor (or type 2 hypervisor). The hypervisor 774 may provide a virtual operating platform for running one or more virtual machines, such as virtual machine 773. A hypervisor may comprise software that creates and runs virtual machine instances. Virtual machine 773 may include a plurality of virtual hardware devices, such as a virtual processor, a virtual memory, and a virtual disk. The virtual machine 773 may include a guest operating system that has the capability to run one or more software applications, such as the RAN intelligent controller (RIC) 630. The virtual machine 773 may run the host operation system 776 upon which the container engine 775 may run. A virtual machine, such as virtual machine 773, may include one or more virtual processors.

In some cases, the software-level components may be run using a dedicated hardware server. In other cases, the software-level components may be run using a virtual machine or containerized environment running on a plurality of machines. In various embodiments, the software-level components may be run from the cloud (e.g., the software-level components may be deployed using a cloud-based compute and storage infrastructure).

Application containers (or containers) may allow applications to be bundled with their own libraries and configuration files, and then executed in isolation on a single operating system (OS) kernel. In some cases, a container may include the compiled code for an application (e.g., composed of microservices) along with the binaries and libraries necessary to execute the application.

As depicted in FIG. 7, a container engine 775 may run on top of the host operating system 776 in order to run multiple isolated instances (or containers) on the same operating system kernel of the host operating system 776. Containers may perform virtualization at the operating system level and may provide a virtualized environment for running applications and their dependencies. The container engine 775 may acquire a container image and convert the container image into running processes. In some cases, the container engine 775 may group containers that make up an application into logical units (or pods). A pod may contain one or more containers and all containers in a pod may run on the same node in a cluster. Each pod may serve as a deployment unit for the cluster. Each pod may run a single instance of an application.

In some embodiments, a virtualized infrastructure manager not depicted may run on the RAN 320 in order to provide a centralized platform for managing a virtualized infrastructure for deploying various components of the RAN 320. The virtualized infrastructure manager may manage the provisioning of virtual machines, containers, and pods. The virtualized infrastructure manager may also manage a replication controller responsible for managing a number of pods.

The disclosed embodiments may be implemented in a mobile edge computing (MEC) environment implemented in conjunction with a 4G, 5G, or other cellular network. The MEC environment may include at least some of the components and functionality described in FIGS. 1-7 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF). The disclosed embodiments can be implemented in a 5G computing cluster comprising a plurality of computing nodes hosting a plurality of containers executing one or more network functions of the 5G computing cluster. An orchestrator executing in the 5G computing cluster may implemented some or all of the disclosed functionality.

Figure 8:
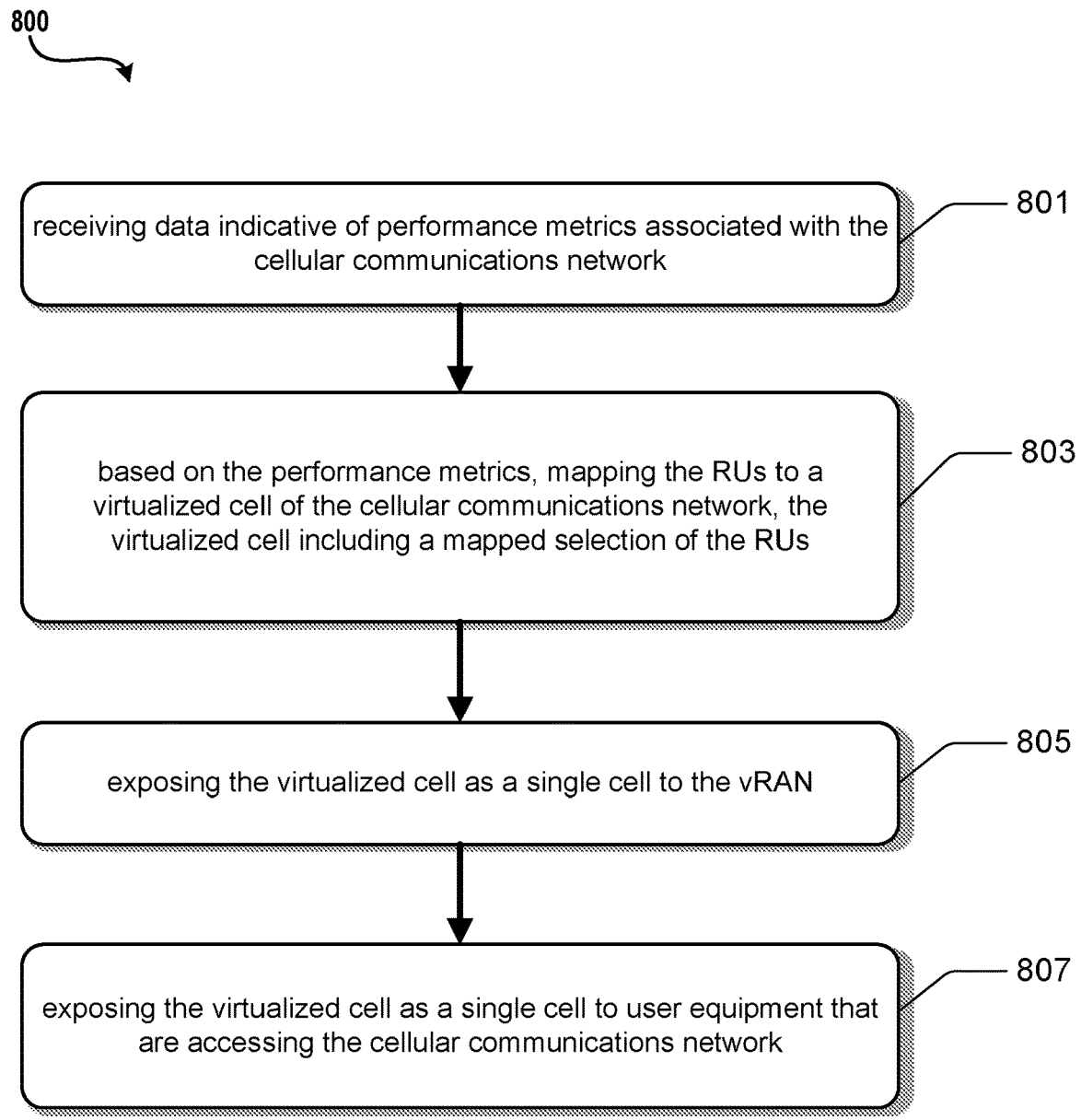
FIG. 8 is a flowchart depicting an example procedure for performing operations in accordance with the present disclosure.

Turning now to FIG. 8, illustrated is an example operational procedure for dynamically adjusting associations between radio units (RUS) and a virtualized radio access network (vRAN) by a virtual translational layer running in a controller of the vRAN. Each of the RUs have a number of antennas and configured to service a cell of a cellular communications network. Such an operational procedure can be provided by one or more components illustrated in FIGS. 1-7. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, handheld computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 800 is described as running on a system, it can be appreciated that the routine 800 and other operations described herein can be executed on an individual computing device or several devices.

Referring to FIG. 8, operation 801 illustrates receiving, by the virtual translational layer, data indicative of performance metrics associated with the cellular communications network.

Operation 803 illustrates based on the performance metrics, mapping, by the virtual translational layer, the RUs to a virtualized cell of the cellular communications network, the virtualized cell including a mapped selection of the RUs.

Operation 805 illustrates exposing, by the virtual translational layer, the virtualized cell as a single cell to the vRAN.

Operation 807 illustrates exposing, by the virtual translational layer, the virtualized cell as a single cell to user equipment that are accessing the cellular communications network.

The vRAN and the user equipment are enabled to interoperate with the virtualized cell as a single cell.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers, which are configured to host physical and/or virtualized computer servers, storage devices, networking equipment and the like, that may be used to implement and distribute the infrastructure and services offered by the service provider.

Figure 9:
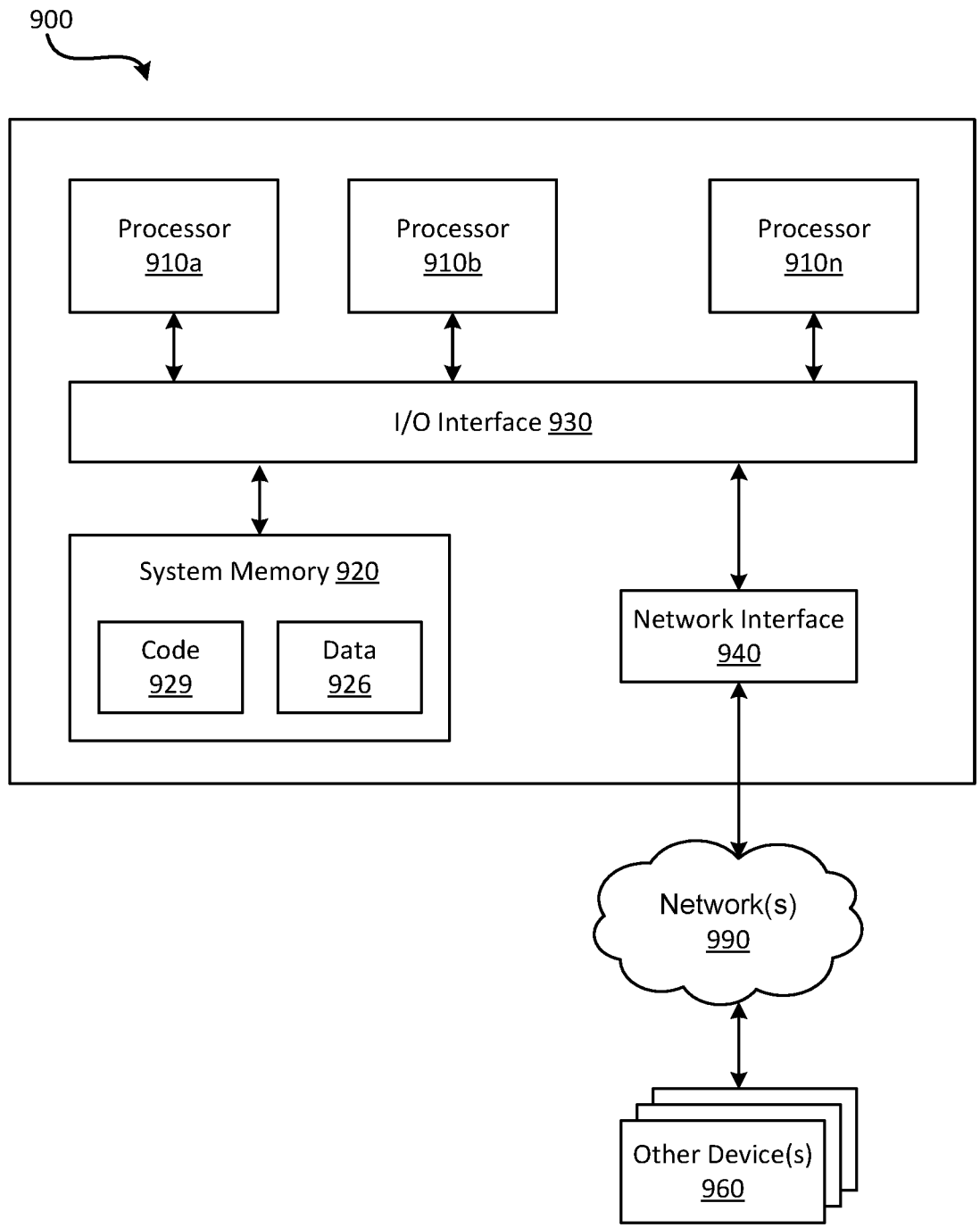
FIG. 9 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 9 illustrates such a general-purpose computing device 900. In the illustrated embodiment, computing device 900 includes one or more processors 910a, 910b, and/or 910n (which may be referred herein singularly as "a processor 910" or in the plural as "the processors 910") coupled to a system memory 920 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 920 as code 929 and data 926.

In one embodiment, I/O interface 930 may be configured to coordinate I/O traffic between the processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or network(s) 990, such as other computer systems or devices as illustrated in FIGS. 1 through 8, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs or via any other suitable type of network and/or protocol.

In some embodiments, system memory 920 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, such as those illustrated in FIG. 9, may be used to implement the described functionality in various embodiments: for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 9, may include other components that are not explicitly shown in FIG. 9, or may utilize an architecture completely different than that shown in FIG. 9.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method of dynamically adjusting associations between radio units (RUs) and a virtualized radio access network (vRAN) by a virtual translational layer running in a controller of the vRAN, each of the RUs having a number of antennas and configured to service a cell of a cellular communications network, the method comprising:
  receiving, by the virtual translational layer, data indicative of performance metrics associated with the cellular communications network;
  based on the performance metrics, mapping, by the virtual translational layer, the RUs to a virtualized cell of the cellular communications network, the virtualized cell including a mapped selection of the RUs;
  exposing, by the virtual translational layer, the virtualized cell as a single cell to the vRAN: and
  exposing, by the virtual translational layer, the virtualized cell as a single cell to user equipment that are accessing the cellular communications network,
  thereby enabling the vRAN and the user equipment to interoperate with the virtualized cell as a single cell.

Clause 2: The further comprising:
  receiving, by the virtual translational layer, uplink transmissions from the user equipment; determining frequency offsets between the mapped RUs; and
  correcting for clock offsets for downlink transmissions based on the determined frequency offsets.

Clause 3: The method of any of clauses 1-2, further comprising adjusting the mapping based on signal-to-noise ratio of the cellular communications network.

Clause 4: The method of any of clauses 1-3, further comprising adjusting the mapping based on throughput of the cellular communications network.

Clause 5: The method of any of clauses 1-4, further comprising adjusting the mapping based on bit error rate of the cellular communications network.

Clause 6: The method of any of clauses 1-5, wherein the virtual translational layer is executed in a RAN Intelligent Controller (RIC).

Clause 7: The method of clauses 1-6, wherein cell ID virtualization is performed by non real time components of the RIC.

Clause 8: The method of any of clauses 1-7, wherein frequency offset correction and fronthaul packet mapping are performed by real time components of the RIC.

Clause 9: A computing system comprising:
  a processing system comprising a processor; and
  computer-readable media having thereon computer-executable instructions that are structured such that, when executed by the processing system, cause the computing system to perform operations comprising:
    executing a virtual translational layer configured to adjust associations between radio units (RUs) and a virtualized radio access network (vRAN), each of the RUs having a number of antennas and configured to service a cell of a cellular communications network;
    receiving, by the virtual translational layer, data indicative of performance metrics associated with the cellular communications network;
    based on the performance metrics, mapping, by the virtual translational layer, the RUs to a virtualized cell of the cellular communications network, the virtualized cell including a mapped selection of the RUs;
    exposing, by the virtual translational layer, the virtualized cell as a single cell to the vRAN; and
    exposing, by the virtual translational layer, the virtualized cell as a single cell to user equipment that are accessing the cellular communications network,
    thereby enabling the vRAN and the user equipment to interoperate with the virtualized cell as a single.

Clause 10: The system of clause 9, further comprising computer-executable instructions that are structured such that, when executed by the processing system, cause the computing system to perform operations comprising:
  receiving, by the virtual translational layer, uplink transmissions from the user equipment;
  determining frequency offsets between the mapped RUs: and
  correcting for clock offsets for downlink transmissions based on the determined frequency offsets.

Clause 11: The system of any of clauses 9 and 10, further comprising computer-executable instructions that are structured such that, when executed by the processing system, cause the computing system to perform operations comprising adjusting the mapping based on signal-to-noise ratio of the cellular communications network.

Clause 12: The system of any of clauses 9-11, further comprising computer-executable instructions that are structured such that, when executed by the processing system, cause the computing system to perform operations comprising adjusting the mapping based on throughput of the cellular communications network.

Clause 13: The system of any of clauses 9-12, further comprising computer-executable instructions that are structured such that, when executed by the processing system, cause the computing system to perform operations comprising adjusting the mapping based on bit error rate of the cellular communications network.

Clause 14: The system of any clauses of 9-13, wherein the virtual translational layer is executed in a RAN Intelligent Controller (RIC).

Clause 15: The system of any clauses of 9-14, wherein cell ID virtualization is performed by non real time components of the RIC.

Clause 16: The system of any clauses of 9-15, wherein frequency offset correction and fronthaul packet mapping are performed by real time components of the RIC.

Clause 17: A computer-readable storage medium having computer-executable instructions stored thereupon which, when executed by one or more processors of a system, cause the system to perform operations comprising:
  executing a virtual translational layer configured to adjust associations between radio units (RUs) and a virtualized radio access network (vRAN), each of the RUs having a number of antennas and configured to service a cell of a cellular communications network;
  receiving, by the virtual translational layer, data indicative of performance metrics associated with the cellular communications network;
  based on the performance metrics, mapping, by the virtual translational layer, the RUs to a virtualized cell of the cellular communications network, the virtualized cell including a mapped selection of the RUs;
  exposing, by the virtual translational layer, the virtualized cell as a single cell to the vRAN: and
  exposing, by the virtual translational layer, the virtualized cell as a single cell to user equipment that are accessing the cellular communications network,
  thereby enabling the vRAN and the user equipment to interoperate with the virtualized cell as a single cell.

Clause 18: The computer-readable storage medium of clause 17, further comprising computer-executable instructions that are structured such that, when executed by the processing system, cause the computing system to perform operations comprising:
  receiving, by the virtual translational layer, uplink transmissions from the user equipment;
  determining frequency offsets between the mapped RUs; and
  correcting for clock offsets for downlink transmissions based on the determined frequency offsets.

Clause 19: The computer-readable storage medium of clauses 17 and 18, further comprising computer-executable instructions that are structured such that, when executed by the processing system, cause the computing system to perform operations comprising adjusting the mapping based on signal-to-noise ratio of the cellular communications network.

Clause 20: The computer-readable storage medium of clauses 17-19, further comprising computer-executable instructions that are structured such that, when executed by the processing system, cause the computing system to perform operations comprising adjusting the mapping based on throughput of the cellular communications network.

What is claimed is:

1. A method of dynamically adjusting associations between radio units (RUs) and a virtualized radio access network (vRAN) by a virtual translational layer running in a controller of the vRAN, each of the RUs having a number of antennas and configured to service a cell of a cellular communications network, the method comprising:
  exposing, by the virtual translational layer, a virtualized cell as a single cell to the vRAN, wherein the virtualized cell includes a mapped selection of the RUs;
  exposing, by the virtual translational layer, the virtualized cell as a single cell to user equipment that are accessing the cellular communications network;
  receiving, by the virtual translational layer, data indicative of performance metrics associated with the cellular communications network;
  based on the performance metrics, determining variations in signal-to-noise ratio (SNR) and network conditions in the cellular communications network;
  based on the variations, updating, by the virtual translational layer, the mapping of the RUs to the virtualized cell of the cellular communications network, wherein the updating comprises updating a number of RUs allocated to the virtualized cell based on the variations;
  exposing, by the virtual translational layer, the virtualized cell as a single cell to the vRAN, wherein the virtualized cell includes the updated mapping of the RUs; and
  exposing, by the virtual translational layer, the virtualized cell as a single cell to user equipment that are accessing the cellular communications network, wherein the virtualized cell includes the updated mapping of the RUs,
  thereby enabling the vRAN and the user equipment to interoperate with the virtualized cell as a single cell.

2. The method of claim 1, further comprising:
  receiving, by the virtual translational layer, uplink transmissions from the user equipment;
  determining frequency offsets between the mapped RUs; and
  correcting for clock offsets for downlink transmissions based on the determined frequency offsets.

3. The method of claim 1, further comprising adjusting the mapping based on throughput of the cellular communications network.

4. The method of claim 1, further comprising adjusting the mapping based on bit error rate of the cellular communications network.

5. The method of claim 1, wherein the virtual translational layer is executed in a RAN Intelligent Controller (RIC).

6. The method of claim 5, wherein cell ID virtualization is performed by non real time components of the RIC.

7. The method of claim 5, wherein frequency offset correction and fronthaul packet mapping are performed by real time components of the RIC.

8. A computing system comprising:
  a processing system comprising a processor; and
  computer-readable media having thereon computer-executable instructions that are structured such that, when executed by the processing system, cause the computing system to perform operations comprising:
  instantiating a virtual translational layer configured to adjust associations between radio units (RUS) and a virtualized radio access network (vRAN), each of the RUs having a number of antennas and configured to service a cell of a cellular communications network;
  exposing, by the virtual translational layer, a virtualized cell as a single cell to the vRAN, wherein the virtualized cell includes a mapped selection of the RUs;
  exposing, by the virtual translational layer, the virtualized cell as a single cell to user equipment that are accessing the cellular communications network;
  receiving, by the virtual translational layer, data indicative of performance metrics associated with the cellular communications network;

based on the performance metrics, determining variations in signal-to-noise ratio (SNR) and network conditions in the cellular communications network;

in response to the variations, updating, by the virtual translational layer, the mapping of the RUs to the virtualized cell of the cellular communications network, the virtualized cell including the mapped selection of the RUs, wherein the updating comprises updating a number of RUs allocated to the virtualized cell based on the variations;

exposing, by the virtual translational layer, the virtualized cell as a single cell to the vRAN; and exposing, by the virtual translational layer, the virtualized cell as a single cell to user equipment that are accessing the cellular communications network, thereby enabling the vRAN and the user equipment to interoperate with the virtualized cell as a single cell.

9. The computing system of claim 8, further comprising computer-executable instructions that are structured such that, when executed by the processing system, cause the computing system to perform operations comprising:

receiving, by the virtual translational layer, uplink transmissions from the user equipment;

determining frequency offsets between the mapped RUs; and correcting for clock offsets for downlink transmissions based on the determined frequency offsets.

10. The computing system of claim 8, further comprising computer-executable instructions that are structured such that, when executed by the processing system, cause the computing system to perform operations comprising adjusting the mapping based on throughput of the cellular communications network.

11. The computing system of claim 8, further comprising computer-executable instructions that are structured such that, when executed by the processing system, cause the computing system to perform operations comprising adjusting the mapping based on bit error rate of the cellular communications network.

12. The computing system of claim 8, wherein the virtual translational layer is executed in a RAN Intelligent Controller (RIC).

13. The computing system of claim 12, wherein cell ID virtualization is performed by non real time components of the RIC.

14. The computing system of claim 12, wherein frequency offset correction and fronthaul packet mapping are performed by real time components of the RIC.

15. A computer-readable storage medium having thereon computer-executable instructions that are structured such that, when executed by a processing system of a computing system, cause the computing system to perform operations comprising:

instantiating a virtual translational layer configured to adjust associations between radio units (RUS) and a virtualized radio access network (vRAN), each of the RUs having a number of antennas and configured to service a cell of a cellular communications network;

exposing, by the virtual translational layer, a virtualized cell as a single cell to the vRAN, wherein the virtualized cell includes a mapped selection of the RUs;

exposing, by the virtual translational layer, the virtualized cell as a single cell to user equipment that are accessing the cellular communications network;

receiving, by the virtual translational layer, data indicative of performance metrics associated with the cellular communications network;

based on the performance metrics, determining variations in signal-to-noise ratio (SNR) and network conditions in the cellular communications network;

in response to the variations, updating, by the virtual translational layer, the mapping of the RUs to the virtualized cell of the cellular communications network, the virtualized cell including the mapped selection of the RUs, wherein the updating comprises updating a number of RUs allocated to the virtualized cell based on the variations;

exposing, by the virtual translational layer, the virtualized cell as a single cell to the vRAN; and exposing, by the virtual translational layer, the virtualized cell as a single cell to user equipment that are accessing the cellular communications network, thereby enabling the vRAN and the user equipment to interoperate with the virtualized cell as a single cell.

16. The computer-readable storage medium of claim 15, further comprising computer-executable instructions that are structured such that, when executed by the processing system, cause the computing system to perform operations comprising:

receiving, by the virtual translational layer, uplink transmissions from the user equipment;

determining frequency offsets between the mapped RUs; and correcting for clock offsets for downlink transmissions based on the determined frequency offsets.

17. The computer-readable storage medium of claim 15, further comprising computer-executable instructions that are structured such that, when executed by the processing system, cause the computing system to perform operations comprising adjusting the mapping based on throughput of the cellular communications network.

* * * * *